United States Patent
Hauck et al.

[11] Patent Number: 5,872,584
[45] Date of Patent: Feb. 16, 1999

[54] APPARATUS FOR PROVIDING INK TO AN INK-JET PRINT HEAD AND FOR COMPENSATING FOR ENTRAPPED AIR

[75] Inventors: Mark Hauck; Norman E. Pawlowski, Jr., both of Corvallis, Oreg.

[73] Assignee: Hewlett-Packard Company, Palo Alto, Calif.

[21] Appl. No.: 550,902

[22] Filed: Oct. 31, 1995

Related U.S. Application Data

[63] Continuation-in-part of Ser. No. 518,847, Aug. 24, 1995, which is a continuation-in-part of Ser. No. 331,453, Oct. 31, 1994, Pat. No. 5,583,545.

[51] Int. Cl.$^6$ ............................. B41J 2/175; B41J 2/195
[52] U.S. Cl. .................................. 347/86; 347/7
[58] Field of Search ................... 347/7, 85, 86, 347/87

[56] References Cited

U.S. PATENT DOCUMENTS

| | | | |
|---|---|---|---|
| 4,475,116 | 10/1984 | Sickling et al. | 346/140 |
| 4,509,062 | 4/1985 | Low et al. | 346/140 |
| 4,739,347 | 4/1988 | Ishikawa et al. | 346/140 |
| 5,040,001 | 8/1991 | Dunn et al. | 346/140 |
| 5,409,134 | 4/1995 | Cowger et al. | 222/1 |
| 5,453,772 | 9/1995 | Aono et al. | 347/87 |
| 5,623,290 | 4/1997 | Iida et al. | 347/7 |

*Primary Examiner*—Safet Metjahic
*Assistant Examiner*—John Chizmar

[57] ABSTRACT

Apparatus for providing ink to an ink-jet print head in a print cartridge at substantially constant pressure and for compensating for air within the print cartridge. A flexible bag is maintained at atmospheric pressure within the print cartridge and actuates a pressure regulator also within the print cartridge. By expanding and contracting, the bag compensates for changes in pressure and temperature that occur while the pressure regulator is shut and that affect air entrapped within the print cartridge.

21 Claims, 11 Drawing Sheets

APPARATUS FOR PROVIDING INK TO AN INK-JET PRINT HEAD AND FOR COMPENSATING FOR ENTRAPPED AIR

CROSS-REFERENCES TO RELATED APPLICATIONS

This application is a continuation-in-part application of U.S. patent application Ser. No. 08/518,847 filed 8/24/95 entitled PRESSURE REGULATED FREE-INK INK-JET PEN by Pawlowski Jr. which in turn is a continuation-in-part of U.S. Ser. No. 08/331,453 filed on Oct. 31, 1994, now U.S. Pat. No. 5,583,545 by Pawlowski et al.

BACKGROUND OF THE INVENTION

The present invention relates generally to the field of ink-jet printing and, more particularly, to the delivery of ink to ink-jet print heads.

Ink-jet technology is relatively well developed. The basics of this technology are described by W. J. Lloyd and H. T. Taub in "Ink-Jet Devices," Chapter 13 of *Output Hardcopy Devices* (Ed. R. C. Durbeck and S. Sherr, Academic Press, San Diego, 1988) and in various articles in the *Hewlett-Packard Journal*, Vol. 36, No. 5 (May 1985), Vol. 39, No. 4 (August 1988), Vol. 39, No 5. (October 1988), Vol. 43, No. 4, (August 1992), Vol. 43, No.6 (December 1992) and Vol. 45. No. 1 (February 1994).

The typical thermal ink-jet print head has an array of precisely formed nozzles attached to a print head substrate that incorporates an array of firing chambers that receive liquid ink (i.e., colorants dissolved or dispersed in a solvent) from an ink reservoir. Each chamber has a thin-film resistor, known as a "firing resistor", located opposite the nozzle so ink can collect between it and the nozzle. When electric printing pulses heat the thermal ink-jet firing resistor, a small portion of the ink near it vaporizes and ejects a drop of ink from the print head. The nozzles are arranged in a matrix array. Properly sequencing the operation of each nozzle causes characters or images to form on the paper as the print head moves past the paper.

In an effort to reduce the cost and size of ink-jet printers and to reduce the cost per printed page, engineers have developed ink-jet printers having small, moving print heads that are connected to large stationary ink reservoirs by flexible ink tubes. This development is called "off-axis" printing. In such printers the mass of the print head is sharply reduced so that the cost of the print head drive system and the over all size of the printer can be minimized. In addition, by separating the ink reservoir from the print head has allowed the ink to be replaced as it is consumed without requiring frequent replacement of costly print heads.

With the development of off-axis printing has come the need for numerous flow restrictions to the ink between the ink reservoir and the print head. These restrictions include additional orifices, narrow conduits, and shut off valves. To over come these flow restrictions and also to provide ink over a range of printing speeds, ink is now transported to the print head at an elevated pressure and a pressure reducer has been added to deliver the ink to the print head at optimum back pressure.

One complication in the evolution of off-axis printing is the increasing need to maintain the back pressure of the ink at the print head to within as small a range as possible. Changes in back pressure greatly affect print density and print quality, and major changes in back pressure can cause either the ink to drool out of the nozzles or to deprime the print cartridge.

There are several causes for such changes in back pressure. One cause occurs when air is entrapped within the print cartridge and the print cartridge is subjected to changes in environmental parameters such as altitude, acceleration, and temperature. If the air entrapped in a print cartridge acts according to the Ideal Gas Law, $PV=nRT$, then any changes in any of these parameters will cause corresponding changes in back pressure. Another cause is the delay between the time the print head starts to eject ink during on-demand printing and the time the pressure regulator actuates to restore the back pressure.

These complications as well as the use of pressurized ink delivery have all resulted in a need for more accurate back pressure regulation in ink-jet print cartridges and for more precise compensation techniques.

SUMMARY OF THE INVENTION

Briefly and in general terms, an apparatus according to the present invention includes a pressure regulator in fluid communication with an ink plenum and a flexible bag within the plenum for actuating the pressure regulator.

In an other aspect of the present invention an actuator bears against the bag and increases the bag's compensation for air.

Other aspects and advantages of the invention will become apparent from the following detailed description, taken into conjunction with the accompanying drawings, illustrating by way of example the principles of the invention.

DESCRIPTION OF THE PREFERRED EMBODIMENTS

As shown in the drawings for the purposes of illustration, the invention is embodied in a apparatus for providing ink to an ink-jet print head in a print cartridge and for compensating for air within the print cartridge.

Figure 1:
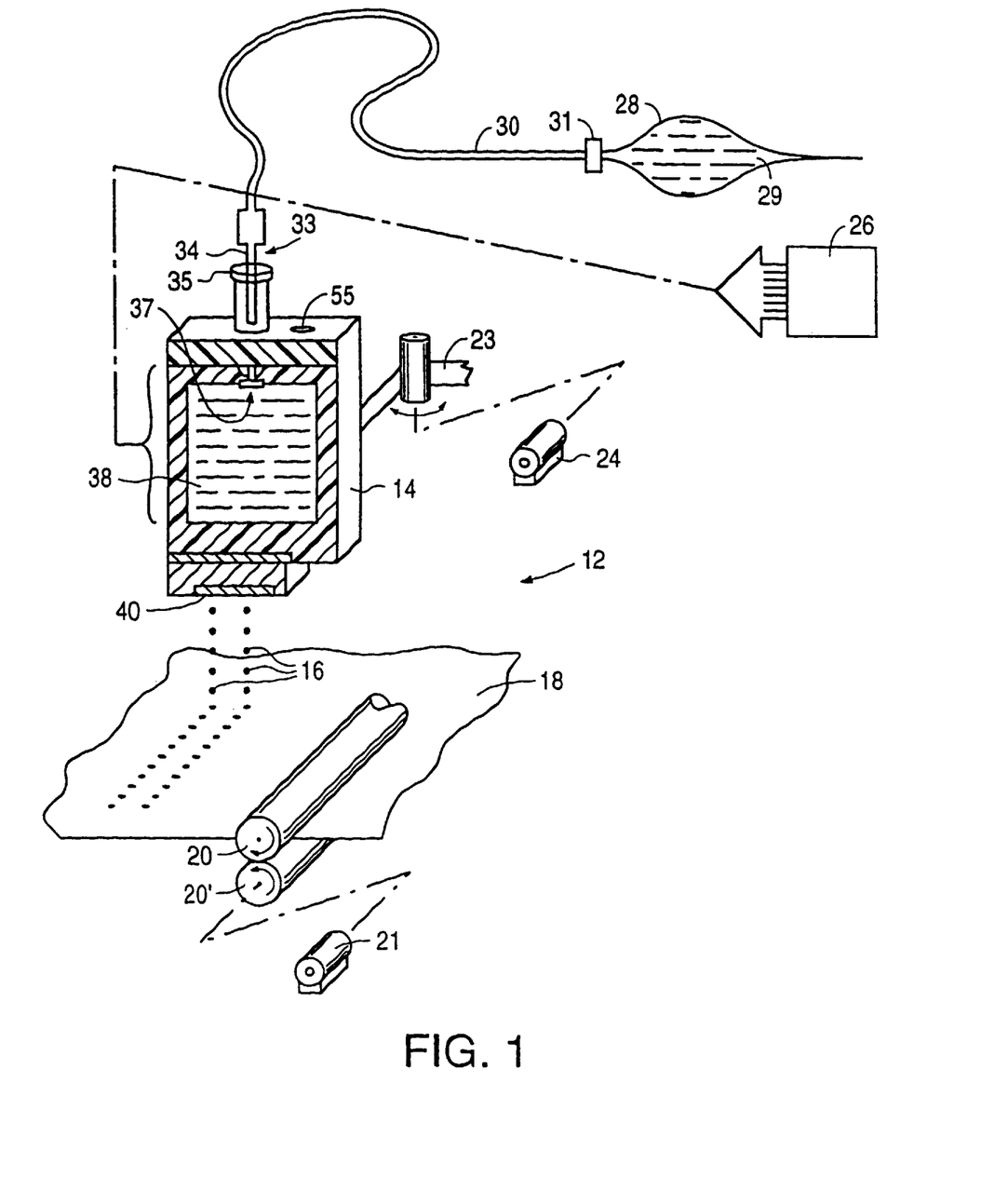
FIG. 1 is a diagrammatic, perspective view in section of an ink-jet printer according to the present invention.

Referring to FIG. 1, reference numeral 12 generally indicates a printer including a print cartridge 14 that ejects drops 16 of ink on command. The drops form images on a printing medium 18 such as paper. The printing medium is moved laterally with respect to the print cartridge 14 by two print rollers 20, 20' and a motor 21 that engages the printing medium. The print cartridge is moved back and forth across the printing medium by a drive belt 23 and a motor 24. The print cartridge contains a plurality of firing resistors, not shown, that are energized on command by an electrical circuit 26. The circuit sequentially energizes the firing resistors in a manner so that as the print cartridge 14 moves laterally across the paper and the paper moved by the rollers 20, 20', the drops 16 form images on the printing medium 18.

In FIG. 1, the ink reservoir 28 is a flaccid bag that contains ink 29. The bag is pressurized to a level of between −5" of water to +60" or more of water for delivery to the print cartridge 14. The ink reservoir is connected to a conduit of flexible tubing 30 by a fluid interconnect 31. The fluid interconnect contains a valve, not shown, that shuts whenever the reservoir is separated from the tubing so that ink does not leak from either the reservoir 28 or the tubing 30 and air is not ingested into the tubing. The tubing 30 terminates in an on-axis fluid interconnect 33 including a hollow, blunt needle 34 and septum 35. The needle pierces the septum and establishes fluid communication between the flexible tubing 30 and the print cartridge 14. Within the print cartridge the ink is delivered to a back pressure regulator 37 that supplies the ink to an ink plenum, also known in the art as an ink accumulator or ink accumulation chamber 38. The pressure regulator 37 maintains the back pressure in the plenum so that ink is supplied to the print head 40 at a substantially constant pressure. This pressure can range from 0 to −50" of water depending on the design of the print head, although the preferable range is from −2" to −7" of water. Ink is ejected from the print head 40 through a plurality of nozzles, not shown, on to the printing medium 18.

Figure 2:
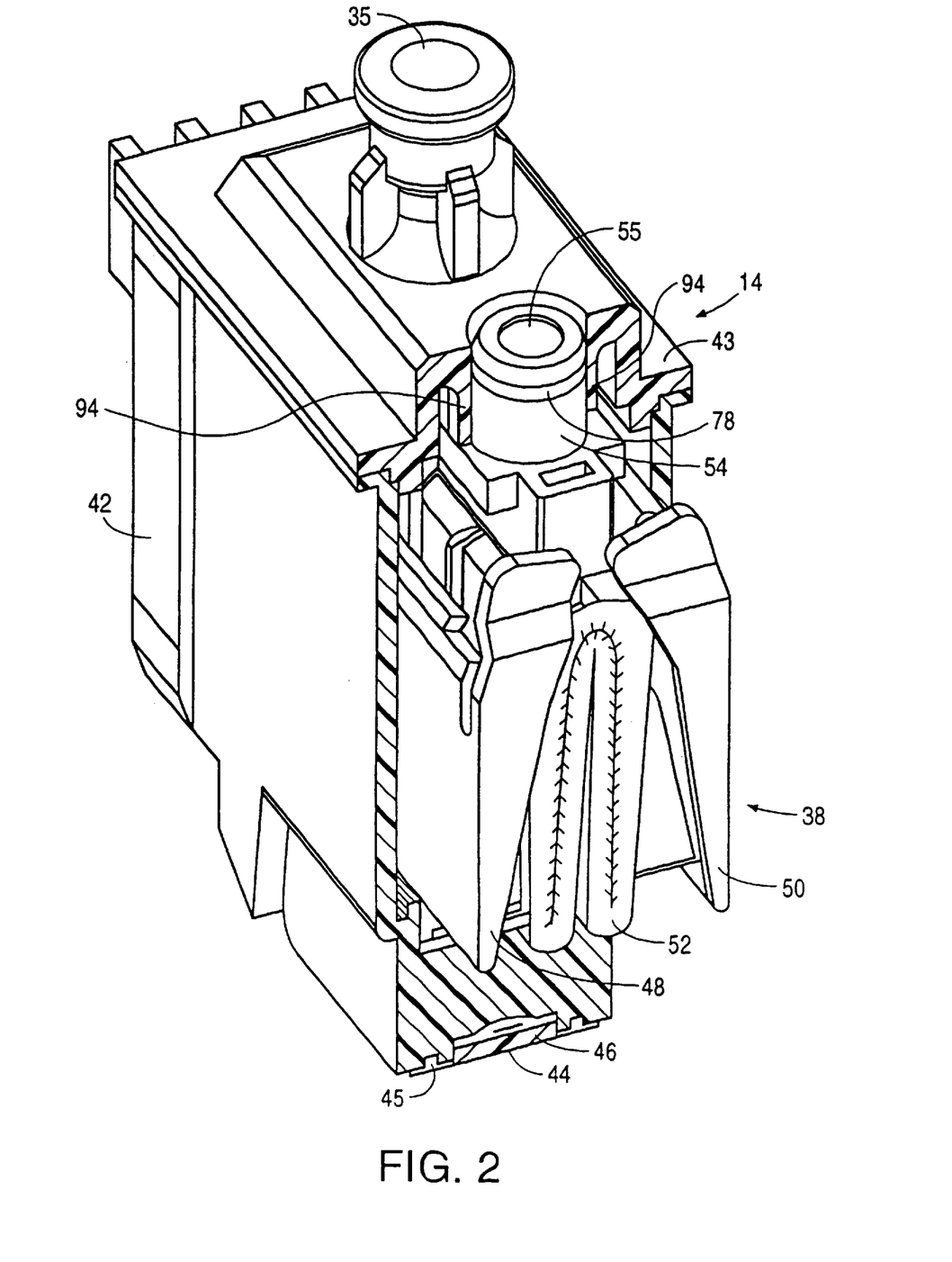
FIG. 2 is a perspective view in section of a portion of the print cartridge of FIG. 1.

Referring to FIG. 2, reference numeral 14 generally indicates the print cartridge that includes a pen body 42 that is the housing for the cartridge and a crown 43 that forms a cap to the housing. Located at a remote end of the pen body is the tab, head assembly 44 or THA. The THA includes a flex circuit 45 and a silicon die 46 that forms the print head 40. The THA is of conventional construction. Also located within the pen body 42 is a pressure regulator lever 48, an accumulator lever 50, and a flexible bag 52. In FIG. 2 the bag is illustrated fully inflated and for clarity is not shown in FIG. 3. The pressure regulator lever 48 and the accumulator lever 50 are urged together by a spring 53, 53' illustrated in FIG. 3. In opposition to the spring, the bag spreads the two levers apart as it inflates outward. The bag is staked to a fitment 54 that is press-fit into the crown 43. The fitment contains a vent 55 to ambient pressure in the shape of a helical, labyrinth path. The vent connects and is in fluid communication with the inside of the bag so that the bag is maintained at a reference pressure. The helical path limits the diffusion of water out of the bag.

Figure 3:
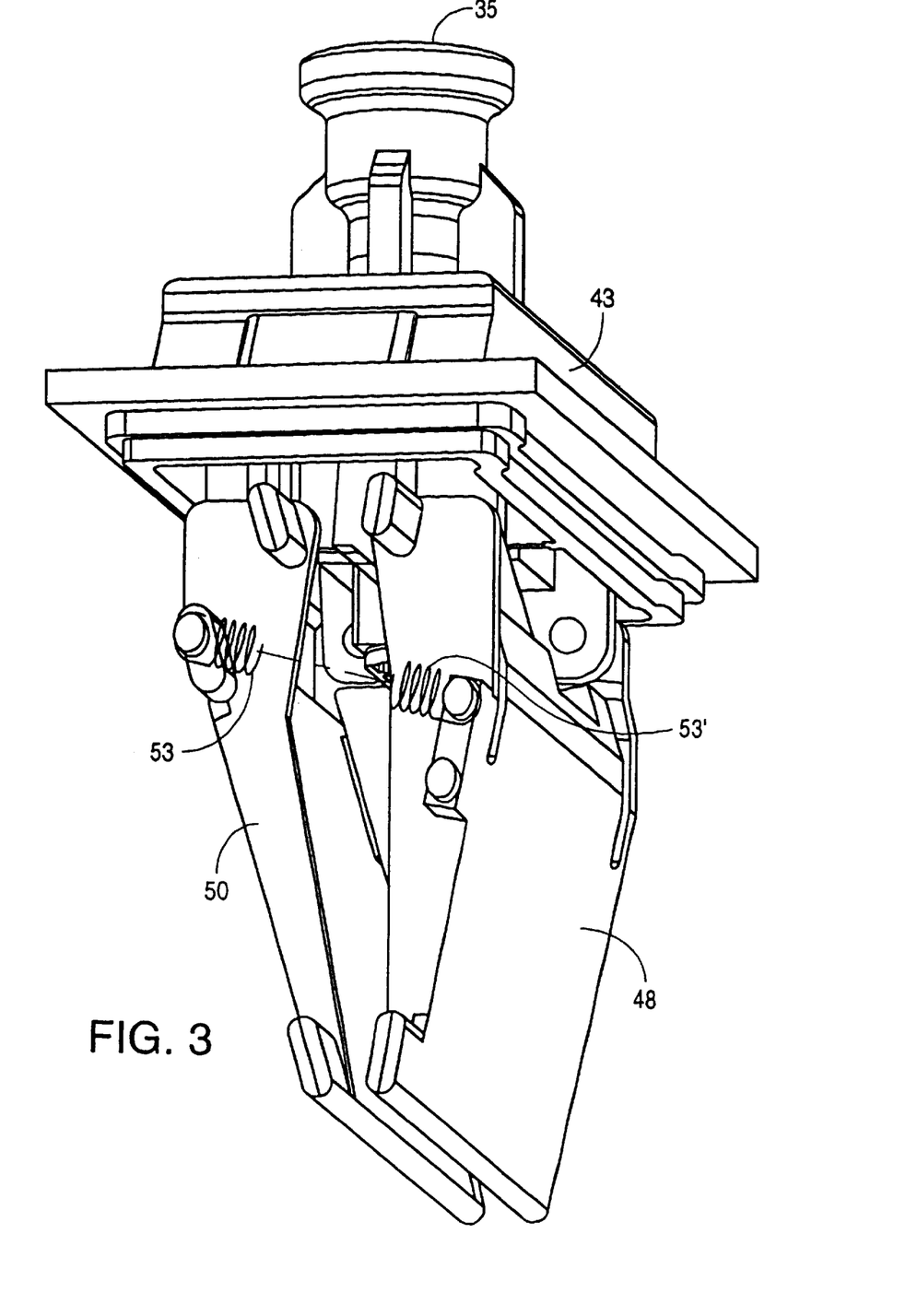
FIG. 3 is a perspective view of a pressure regulator sub-assembly of the print cartridge of FIG. 1. For clarity the flexible bag is not shown.
Figure 4:
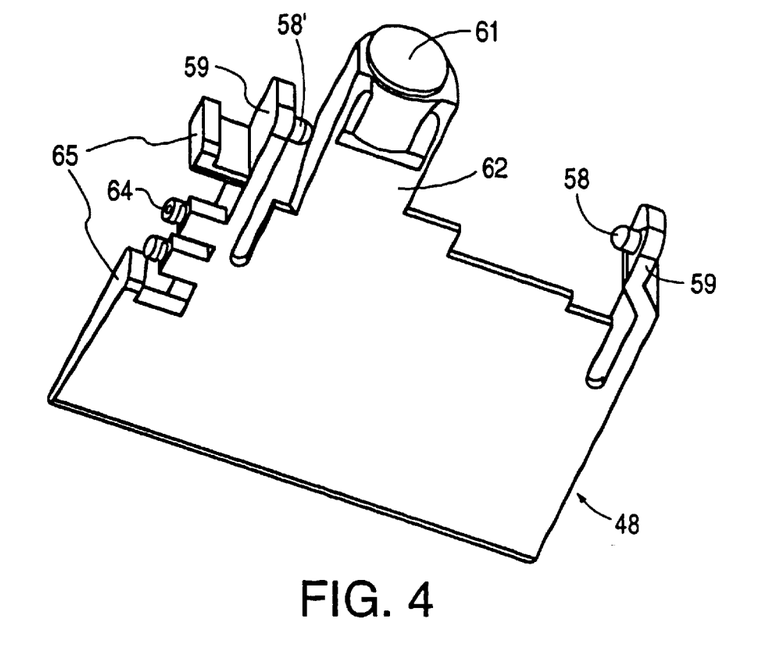
FIG. 4 is a perspective view of a pressure regulator lever of the pressure regulator sub-assembly of FIG. 3.
Figure 5:
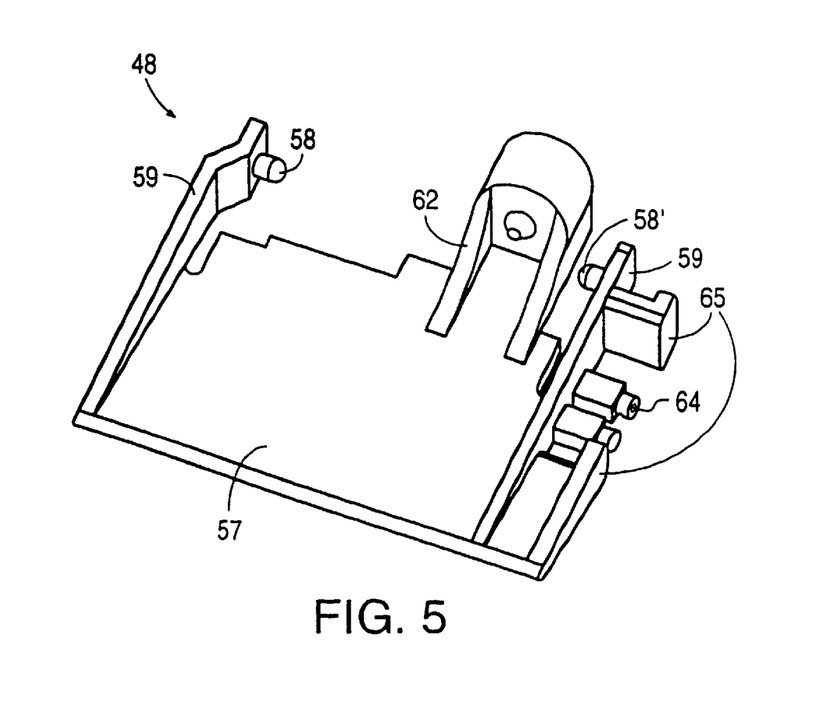
FIG. 5 is a perspective view of the opposite side of the pressure regulator lever of FIG. 4.
Figure 16:
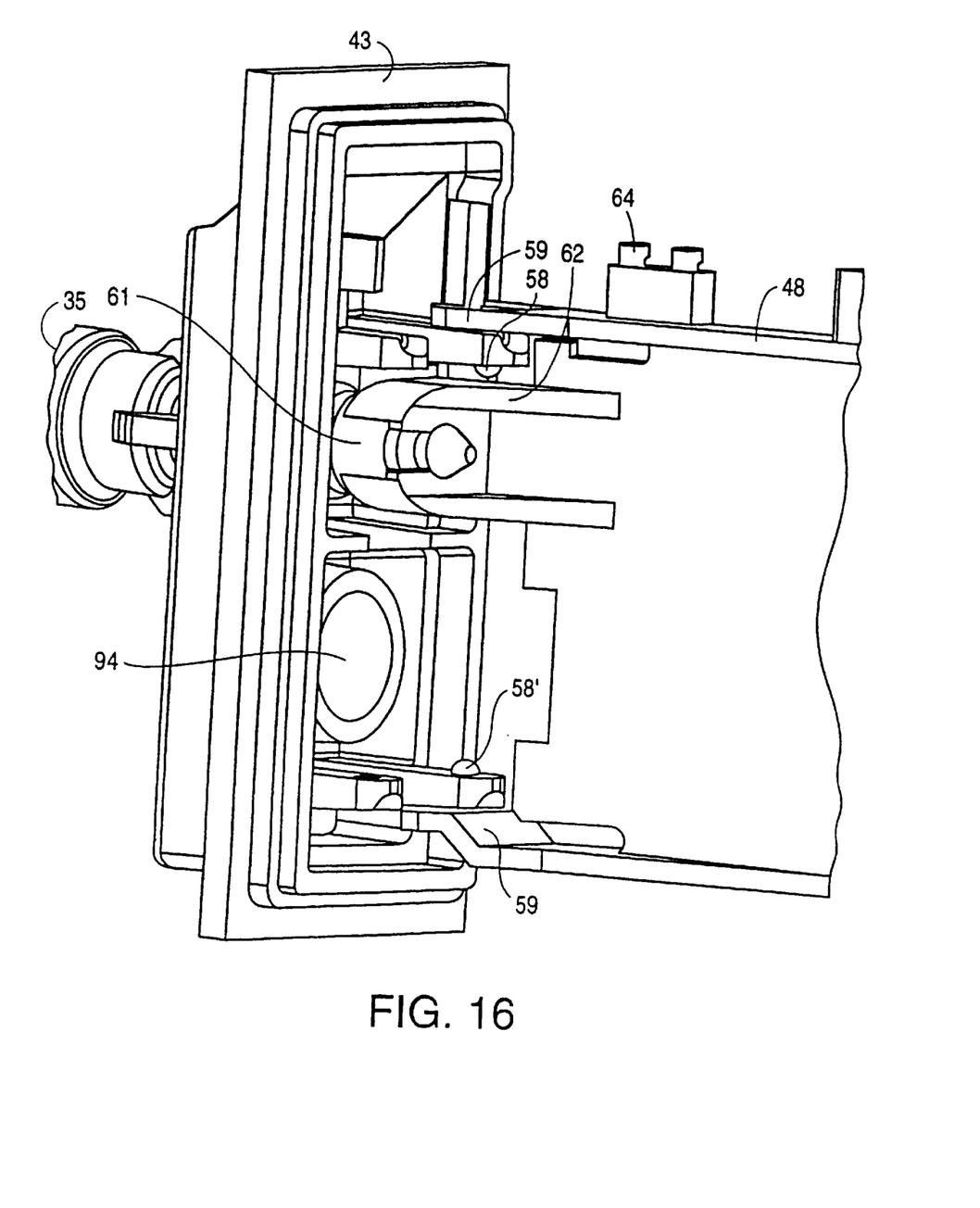
FIG. 16 is a perspective view, partially cut away, of the crown and the pressure regulator lever of FIG. 3. For clarity the accumulator lever is not illustrated.
Figure 19:
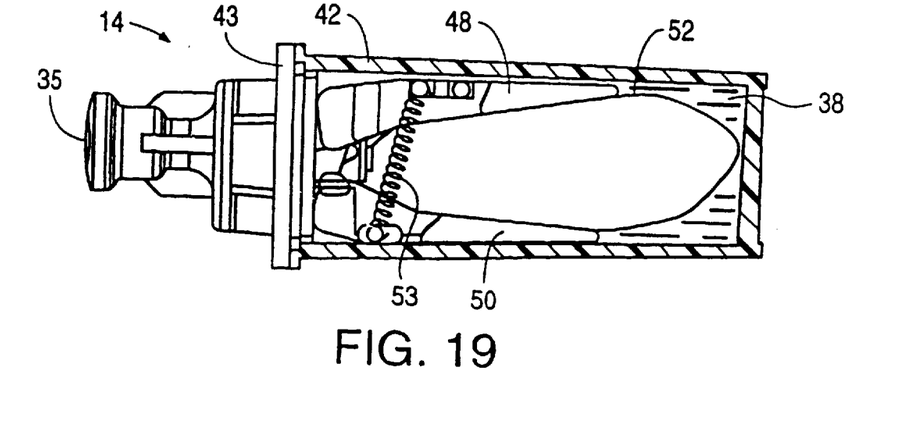

The pressure regulator lever 48 is illustrated in detail in FIGS. 4 and 5. Reference numeral 57 generally indicates the location of the area where the bag 52 directly bears against the lever. The lever 48 rotates about two opposed axles 58 that form the axis of rotation of the lever. The rotation of the lever is stopped when the lever engages the pen body 42 as illustrated in FIG. 19. The axles are located at the ends of cantilevers 59 formed by deep slots so that the cantilevers and the axles can be spread apart during manufacture and snapped onto place on the crown 43 as illustrated in FIG. 16. Perpendicular to the plane of the regulator level 48 is a valve seat 61 and a valve seat holder 62. The valve seat is pressed into place on the holder and is fabricated from a resilient material. In response to expansion and contraction of the bag 52, the regulator lever 48 rotates about the axles 58, 58' and causes the valve seat to open and shut against a mating surface on the crown 43 as described below. This rotational motion controls the flow of ink into the ink plenum 38, FIG. 1. There is an optimization between maximizing the force on the valve seat and obtaining sufficient motion of the lever. In the embodiment actually constructed the lever ratio between the distance between the centroid of the lever, generally at point 57, and the axles 58 and the distance between the center of the valve seat and the axles 58 is between two to one and five to one with four to one being preferred. The pressure regulator also includes a spring boss 64 and engages the spring 53, FIG. 3. The spring boss is protected during manufacture by two shoulders 65 which are not illustrated in FIG. 3.

Figure 6:
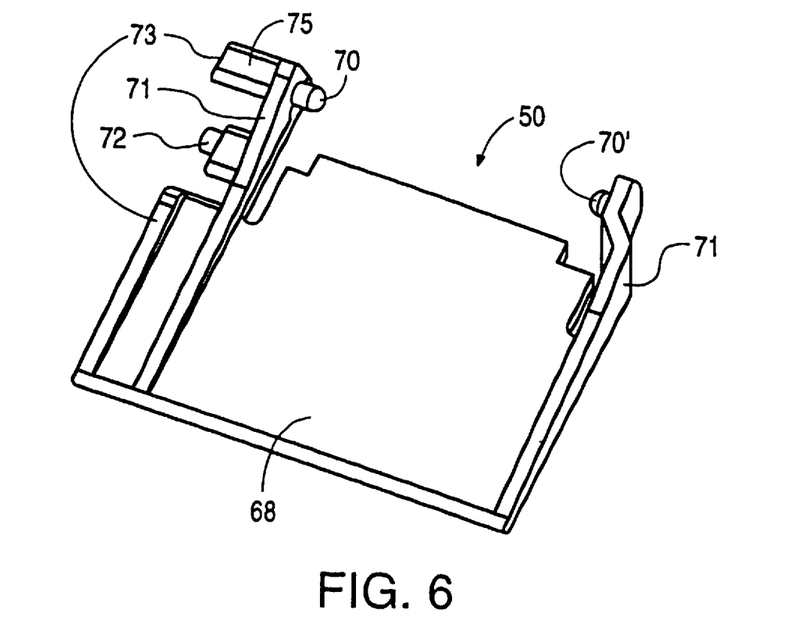
FIG. 6 is a perspective view of an accumulator lever of the pressure regulator sub-assembly of FIG. 3.

The accumulator lever 50 is illustrated in FIG. 6 and includes an actuation area 68 where the bag 52 directly bears against the lever. The lever rotates about two opposed axles 70, 70' that form an axis of rotation of the accumulator lever. The axles are remotely located on cantilevers 71 so that the axles and the cantilevers can be spread apart during manufacture and snapped into place on the crown 43 as described below. The accumulator lever also includes a spring boss 72 that engages the other end of the spring 53, FIG. 3. Like the spring boss 64 on the pressure regulator, the boss 72 on the accumulator is protected during manufacture by the shoulders 73. These shoulders are not illustrated in FIG. 3.

The accumulator lever 50 and the bag 52 operate together to accommodate changes in volume due to any air that may be entrapped in the print cartridge 14, FIG. 1 as well as due to any other pressure changes. The accumulator acts to modulate any fluctuations in the back pressure. The accumulator lever squeezes the bag the inside of which is at ambient pressure, forces air out of the bag and allows air trapped in the print cartridge to expand.

Although most of the accumulation is provided by the movement of the accumulator lever 50 and the bag 52, there is additional accumulation provided by the pressure regulator lever 48 in cooperation with the resilient valve seat 61, FIG. 4. The valve seat acts as a spring and allows some movement of the regulator lever 48 while the valve is shut. In other words, as the back pressure in the plenum 38 decreases, the bag 52 exerts less force on the levers and the spring 53 urges the levers together. The motion of the regulator lever compresses the valve seat and the regulator lever shuts a little further. This movement of the regulator lever 48 with the bag 52 results in some additional air accommodation.

It should be appreciated that the boss 72 on the accumulator lever 50 is closer to the axis of rotation of the accumulator lever than the boss 64, FIGS. 4 and 5, on the pressure regulator lever is to its axis of rotation. This difference in distance causes the accumulator lever to actuate before the pressure regulator lever moves.

Figure 15:
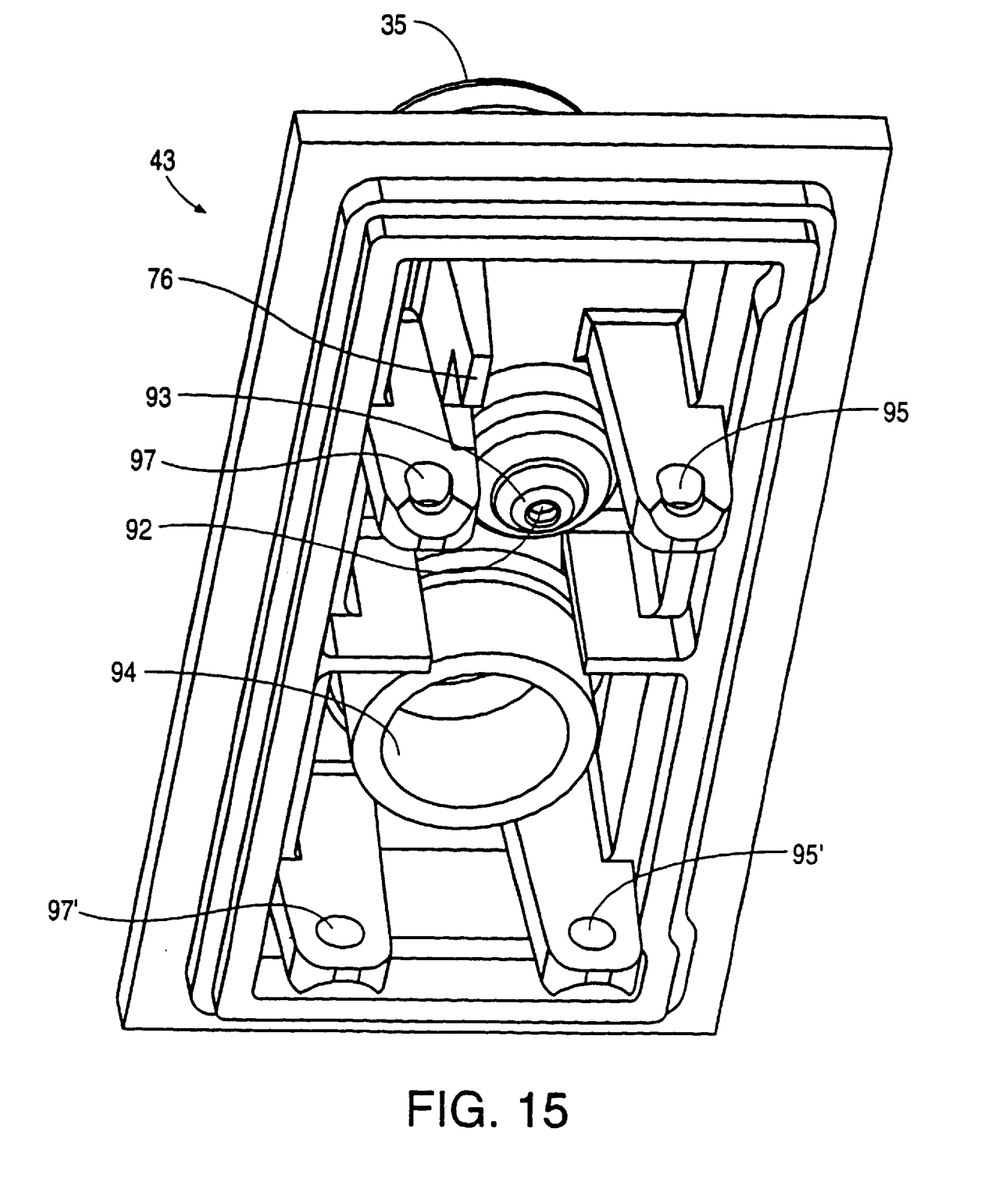
FIG. 15 is a perspective view of the crown for the print cartridge of FIG. 2.
Figure 18:
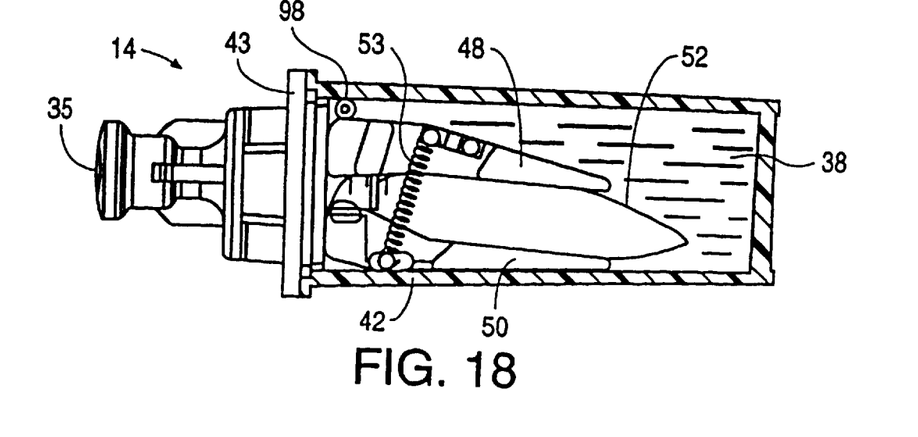

The accumulator lever 50 rotates about the axles 70 until a stop 75 on the lever engages a surface 76 within the crown 43 as illustrated in FIG. 15. The stop prevents the lever from moving too close and interfering with the pressure regulator lever 48 when the back pressure in the ink plenum drops. The accumulator lever rotates in the other direction until coming into contact with the pen body 42 as illustrated in FIGS. 18 and 19.

Referring to FIG. 3 reference numeral 53 generally indicates a helical extension spring that urges the two levers 48, 50 together. The spring is preloaded and engages the bosses 64, 72 with a coil loop at each distal end. Each loop is a parallel, cross-over, fully closed, centered loop. This spring is designed to have the least amount of variation in its force constant over its full range of travel so that the back pressure can be regulated as closely as possible.

Figure 7:
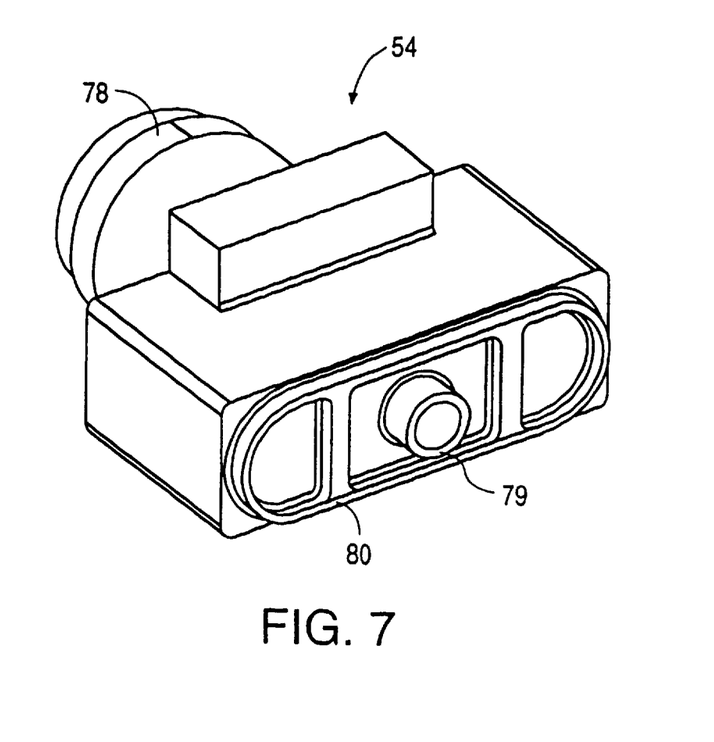
FIG. 7 is a perspective view of a fitment for the print cartridge of FIG. 2.

The fitment 54, illustrated in FIGS. 2 and 7, supports the bag 52 and attaches the bag to the crown 43. The fitment has a lip 78 that engages the crown and forms a hermetic seal with it. Within the fitment is a vent 55 that provides communication between the interior of the bag and ambient pressure. At the distal end of the fitment is a raised, circular boss 79 and a race-track shaped outer boss 80. The bag 52 is staked to both bosses. The circular boss provides the main seal between the bag and the fitment. The race-track shaped boss provides a secondary, redundant sealing surface as well as provides additional support and positioning for the bag.

Figure 8:
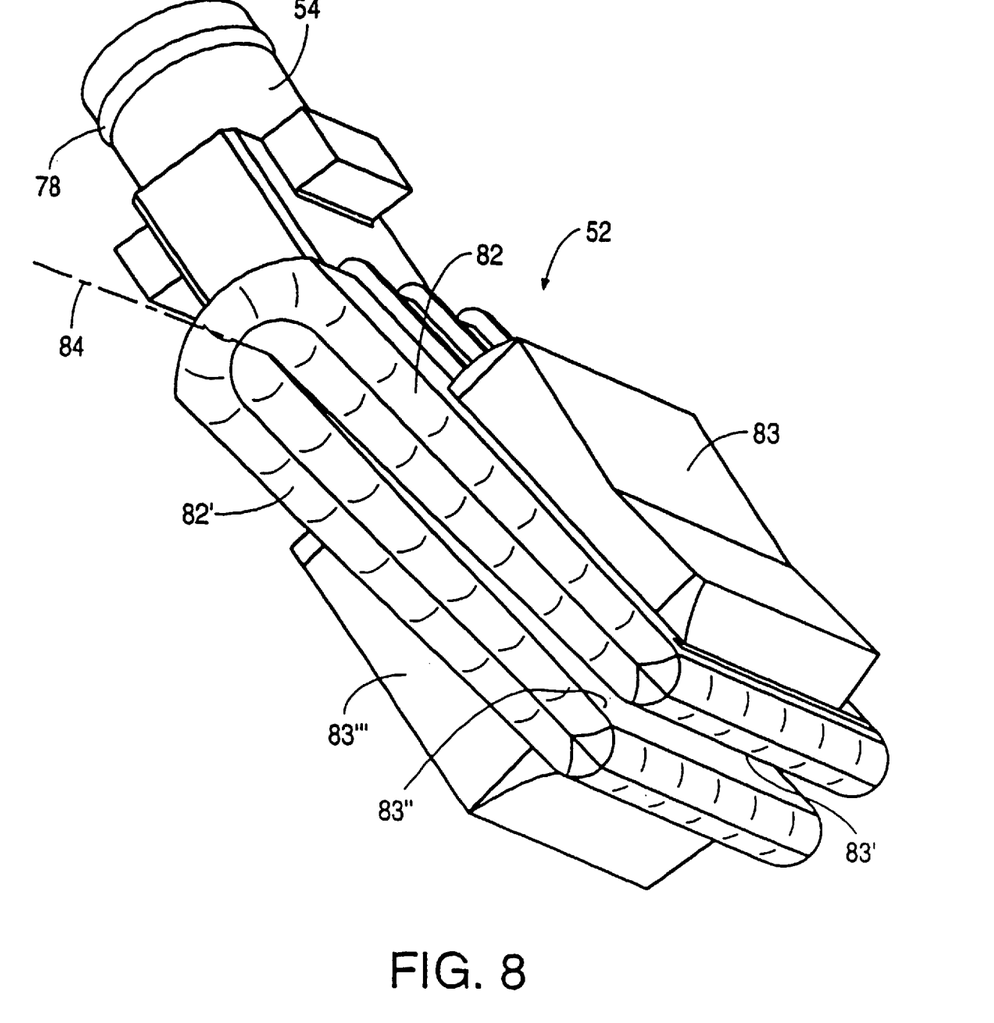
FIG. 8 is a perspective view of the flexible bag and fitment for the print cartridge of FIG. 2.
Figure 9:
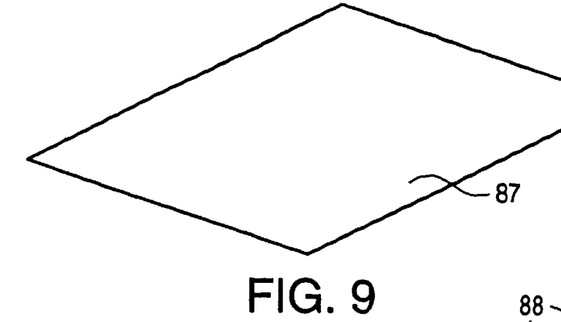
FIGS. 9 through 14 are diagrammatic views of the process for making the flexible bag of FIG. 8.
Figure 10:
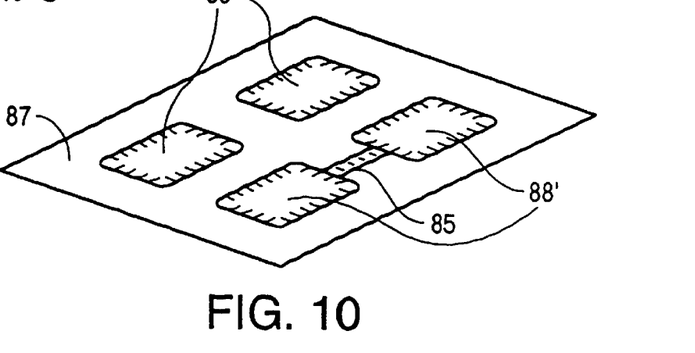
Figure 12:
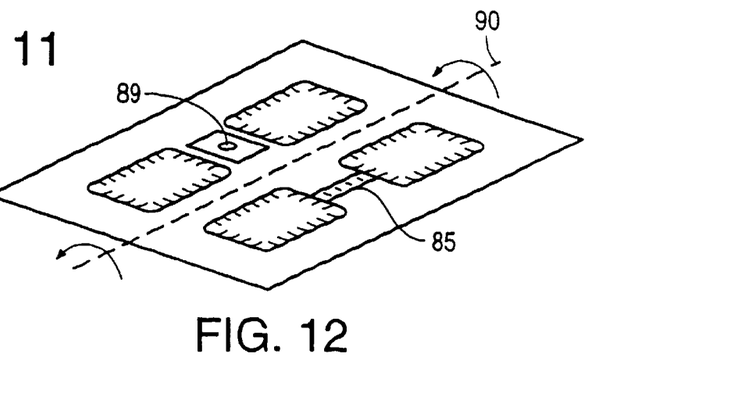

The flexible bag 52, illustrated in FIGS. 2 and 8, expands and contracts as a function of the differential pressure between the back pressure in the ink plenum 38 and ambient pressure communicated through the vent 55 in the fitment 54. The bag is shown fully inflated in FIG. 8. The bag is designed to push against the two levers 48, 50 with maximum contact area through the entire range of travel of the levers. The bag is formed from a single sheet of multilayer film and includes two lungs 82 that expand and contract about an axis 84. The lungs communicate with each other and are maintained at the same reference pressure. Each lung has two raised areas 83 on either side so that there are four raised areas in all. The two inner raised areas that bear against each other are not shown in FIG. 8 but are indicated by reference numerals 83' and 83". The side opposite the fitment contains a raised communication channel 85, FIGS. 10,12 between the raised areas which allows a path for air to flow when the bag is completely deflated. The raised areas are thinner that the rest of the bag and provide greater compliance to the travel of the levers and the motion of the lungs about the axis 84. The raised areas are designed to eliminate relative motion or sliding of the bag with respect to the levers. In systems that actuate on very slight pressures this undesirable affect is called hysteresis. The combination of the lungs and raised areas provides extra material into which the bag can expand as well as maximizes the change in ink volume displaced by the bag with any change in differential pressure.

Figure 11:
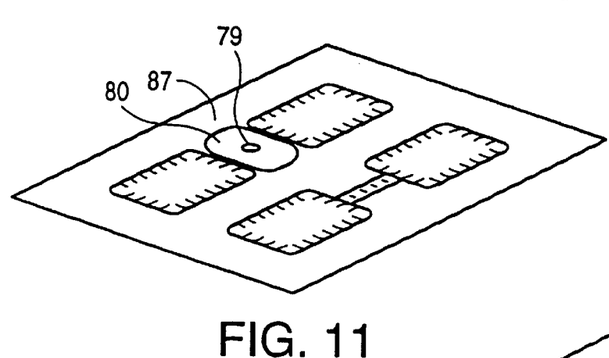
Figure 13:
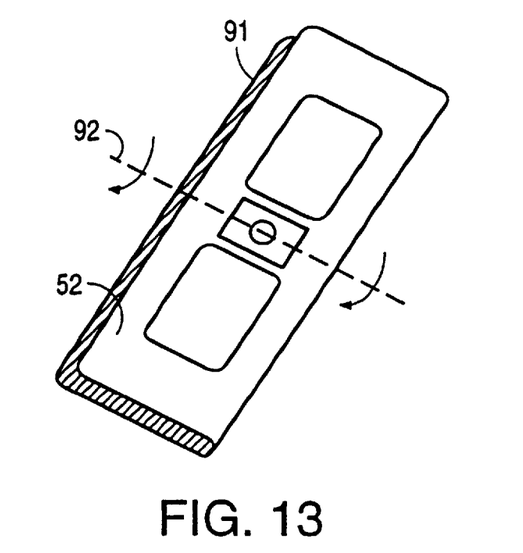
Figure 14:
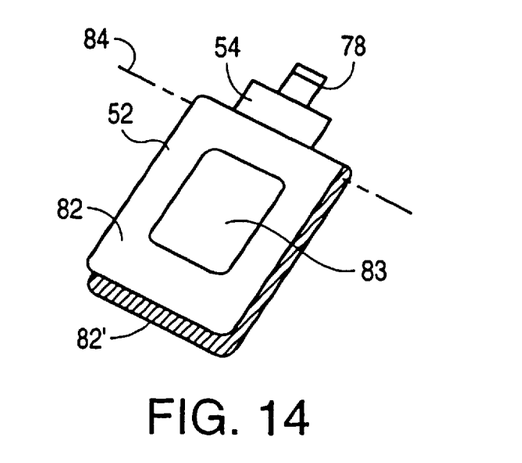

The process for making the bag 52 is illustrated in FIGS. 9–14. First, a sheet 87 of flat film is cut to size, FIG. 9. The film is a multilayer structure between one and three mils (one mil is 25.4 microns) thick, which 1.5 mils being the preferred thickness. In the preferred embodiment, three materials show acceptable performance: (1) PE/tie/PVDC/tie/PE, (2) PE/tie/PVDF/tie/PE, and (3) PE/tie/EVOH/tie/PE. PVDC is polyvinylidene chloride; DOW version is known as SARAN. EVOH is ethylene-vinyl alcohol copolymer. PE is polyethylene, tie is a layer used to bond the dissimilar materials together. PVDF is polyvinylidenefluoride and is sold under the trade name of Kynar. Next, the sheet is placed over a die plate, and heat and vacuum are applied to form the four raised areas 88, 88', FIG. 10. Note that two of the four raised areas or pockets 88' are in communication. Thereafter, the sheet 87 is heat staked to the two bosses 79, 80 on the fitment 54, FIG. 7 as shown in FIG. 11. Next, a hole 89 is made in the film in the center of the circular boss 79 to establish communication to the vent 55 in the fitment. The sheet is then folded along axis 90 and the perimeter of the bag where the margins come together is staked. This staking occurs along the three open seams and is indicated by reference numeral 91 in FIG. 13. The perimeter of the bag is then trimmed. Thereafter, the bag is folded along the longitudinal axis 92 of the fitment as illustrated in FIG. 13. This forms the two lungs 82, 82' in the bag. Referring to FIGS. 13, 14, and 8, the longitudinal axis 92 of the fitment and the line of folding in FIG. 13 is parallel to the axis 84 of rotation of the two lungs during expansion/contraction of the bag.

FIG. 15 illustrates the bottom side of the crown 43 which includes a valve face 93 and the orifice 92 through which ink enters the plenum 38. The valve face mates with the valve seat 61, FIG. 4 on the pressure regulator lever 48. This mating is also shown in FIG. 16. Ink flows through the fluid interconnect 33, FIG. 1, the septum 35, and the orifice 92. At orifice 92 the back pressure within the plenum 38 is controlled by the lever 48. Next to the valve face 93 on the crown 43 is a circular boss 94 that receives the lip 78 on the fitment 54, FIG. 8. The boss 94 and the lip form a hermetic seal. The axles 58, 58' FIG. 5 on the pressure regulator lever 48 are snapped into the journals 95, 95' as permitted by the cantilevered construction described above. In like manner the axles 70, 70' on the accumulator lever 50 are received in the journals 97, 97', FIG. 15. Also located on the bottom side of the crown is the surface 76 that engages the stop 75, FIG. 6 on the accumulator lever 50. The stop 75 and the surface 76 prevent the accumulator lever from interfering with the pressure regulator lever 48.

Figure 17:
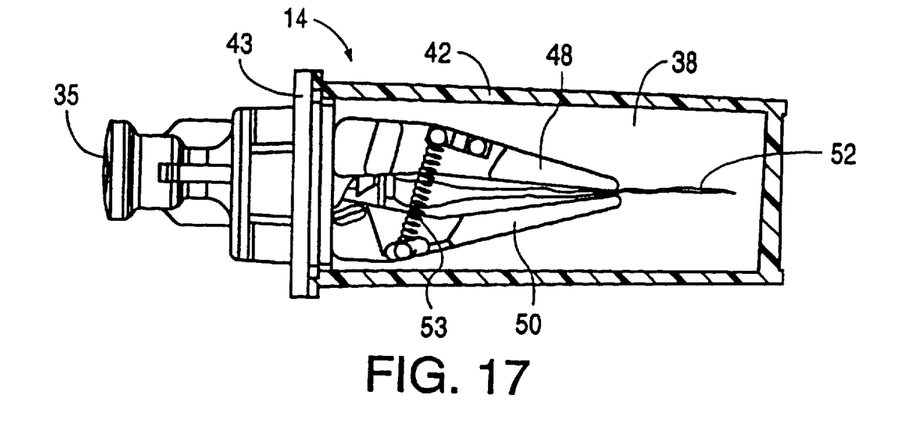
FIGS. 17 through 19 are side elevation views, partially in section, illustrating the operation of the print cartridge of FIG. 2.

The operation of the print cartridge 14 is illustrated in FIGS. 17, 18, and 19. In the initial condition of the cartridge there is no ink within the ink plenum 38, and the bag 52 is limp. The back pressure in the plenum equals ambient pressure. The spring 53 urges the two levers 48, 50 fully together.

Next, the needle 34, FIG. 1 is inserted into the septum 35 and a vacuum is drawn on the nozzles in the print head 40 to draw ink into the print cartridge. In response to this vacuum the accumulator lever 50 moves first, and the bag begins to expand as shown in FIG. 18. The accumulator lever continues to rotate about its axis of rotation until it engages the side wall of the pen body 42 as shown in FIG. 18. At this point the pressure regulator lever 48 begins to move, and ink begins to enter the plenum 38 through orifice 92, FIG. 15.

The regulator lever 48 can rotate about its axis of rotation until it engages the side wall of the pen body 42 as shown in FIG. 19. This is the "full-open" position of the valve. The regulator lever moves between the states illustrated in FIGS. 18 and 19 depending on the speed of printing and how fast ink is required by the print head.

Once the plenum 38 is filled with ink or printing has stopped, the pressure regulator lever 48 will slowly rotate and close the orifice at the urging of the spring 53. The levers 48 and 50 return to the state illustrated in FIG. 18 which is the normal or steady state condition of the print cartridge. This state occurs just prior to or subsequent to printing.

Referring to FIG. 18, reference numeral 98 indicates an air bubble that has entered the ink plenum 38. If the print cartridge is subjected to an elevation in temperature or increased altitude, the air bubble will expand in the plenum. The expansion of the air bubble will be compensated for by the contraction of the bag 52 due to a pressure change caused by a volume change of the bubble which in turn causes the accumulator lever to move from the state illustrated in FIG. 18 toward that illustrated in FIG. 17. In addition, there will be some accompanying motion of the regulator lever 48 because of the resilience of the valve seat 61. On the other hand, if the air bubble contracts, the bag will expand in response and the pressure regulator lever 48 will open the orifice and admit ink onto the plenum. In other words, any expansion or contraction of an air bubble will cause the bag to compensate in reverse, that is by contracting to expansion and expanding to contraction. Each of the levers tracks the motion of the bag and the accumulator lever 50 rotates before the regulator lever 48 because of the difference in lever arm distances.

When the ink reservoir 28, FIG. 1 is depleted of ink, the levers 48, 50 rotate to the "fullopen" position in FIG. 19 and the print head stops ejecting ink.

Although specific embodiments of the invention have been described and illustrated, the invention is not be limited to the specific forms or arrangement of parts so described and illustrated herein. The invention is limited only by the claims.

We claim:

1. A back pressure regulator device for a ink-jet printing apparatus having an ink-jet print head within a print cartridge, and an ink plenum within the print cartridge in fluid communication with the print head, the device comprising:

means for providing ink to the print head at substantially constant back pressure and for compensating for air within the print cartridge, including
      a pressure regulator means in fluid communication with the ink plenum for supplying ink to the print head at substantially constant pressure;
      a flexible bag within the ink plenum maintained at an internal reference pressure, said bag compensates for air within the print cartridge; and
      an actuator means for the back pressure regulator device and connected to said pressure regulator means, said bag directly bears against said actuator means and thereby actuates said pressure regulator device.

2. The apparatus of claim 1 further comprising:

urging means, operatively connected to the bag, for urging the bag against said internal reference pressure, thereby increasing said bag's compensation for air within the print cartridge.

3. The apparatus of claim 2 wherein said urging means is an accumulator actuator that applies a substantially constant force against the reference pressure within said bag.

4. The apparatus of claim 1 further comprising:

valve means adapted for coupling said pressure regulator device to a supply of ink, wherein the actuator means engages said valve, said valve having a resiliently deformable valve seat such that said actuator, valve, and valve seat compensate for air within the print cartridge.

5. Apparatus for providing ink to an ink-jet print head in a print cartridge at substantially constant pressure and for compensating for air within the print cartridge, comprising:

an ink-jet print head within a print cartridge;
   an ink plenum within the print cartridge in fluid communication with the print head ;
   a pressure regulator in fluid communication with the ink plenum for supplying ink to the print head at substantially constant pressure;
   an expandable/contractible bag within the ink plenum, said bag having two lungs maintained at an internal reference pressure and with a common axis of expansion/contraction, said lungs are coupled to communicate with each other and compensate for air within the print cartridge, wherein said axis of expansion/contraction is substantially defined by a region of coupling of said lungs; and
   a pressure regulator actuating lever means for actuating the pressure regulator and connected thereto, said lever directly bears against said lungs and thereby actuates said pressure regulator, said lever means having an axis of rotation parallel with said axis of expansion/contraction of the lungs so that said lever means tracks any expansion/contraction of the lungs.

6. The apparatus of claim 5 further comprising:

an accumulator lever means for applying a substantially constant force against the reference pressure in the lungs, said accumulator lever means having a axis of rotation parallel with said axis of expansion/contraction of the lungs so that said accumulator lever means tracks any expansion/contraction of the lungs.

7. The apparatus of claim 5 wherein one lung has a region of enhanced sensitivity to differential pressure across said region and said region bears against the pressure regulator actuating lever means.

8. The apparatus of claim 6 wherein one lung has a region of enhanced sensitivity to differential pressure across said region and said region bears against the accumulator lever means.

9. The apparatus of claim 6 wherein each lung has a region of enhanced sensitivity to differential pressure across said region and each of said regions bears against an adjacent lever means.

10. The apparatus of claim 5 wherein each lung has a region of enhanced sensitivity to differential pressure across said region and each of said regions bears against the other region.

11. Ink-jet printing apparatus, comprising:

a remote ink reservoir containing ink under a pressure of P1;
    an ink-jet print heads;
    an ink plenum in fluid communication with the print heads;
    a conduit for ink selectively connecting the remote reservoir and the plenum;
    a pressure regulator in fluid communication with the ink plenum and connectable thereto for supplying ink to the print head at a substantially constant back pressure of P2, where P1 is substantially greater than P2;
    a predetermined area within the print cartridge to collect air;
    an expandable/contractible bag within the ink plenum maintained at an internal reference pressure, said bag being in fluid communication with the predetermined air collection area and compensates for air within the print cartridge; and
    an actuator for the pressure regulator and connected thereto, said bag directly bears against said actuator and thereby actuates said pressure regulator.

12. The apparatus as set forth in claim 11, said remote reservoir further comprising:

a replaceable ink reservoir.

13. The apparatus as set forth in claim 11, said remote reservoir further comprising:

an ink reservoir refillable with a supply of ink.

14. The apparatus as set forth in claim 11, said remote reservoir further comprising:

a flaccid bag pressurized to a predetermine level.

15. The apparatus as set forth in claim 11, further comprising:

said actuator is a first lever having a range of motion limited by engagement with a first inner wall of said print cartridge; and said regulator is a second lever having a range of motion limited by engagement with a second inner wall of said print cartridge, such that said first lever engages said first inner wall prior to said second lever engaging said second inner wall of said print cartridge.

16. An ink-jet hard copy apparatus, comprising:

a mechanism for moving print media through said printer;

at least one ink supply, said ink supply being adapted to be replaced or filled;

at least one conduit coupled to said ink supply;

at least one print cartridge;

a mechanism for scanning said cartridge with respect to a print medium positioned adjacently to said cartridge by said mechanism for moving print media through said printer;

each said at least one print cartridge having a substantially sealed housing, said housing having an ink inlet port for coupling said conduit to said cartridge, at least one ink accumulator chamber within said housing, at least one print head fluidically coupled to said at least one ink accumulator chamber for receiving ink therefrom, an ink flow and pressure control mechanism mounted within said ink accumulator chamber, said ink flow and pressure control mechanism including a valve mechanism coupled to said ink inlet port, an expandible and contractible bag, said bag having a vent to ambient atmospheric pressure, a print head back pressure regulator, an actuator, wherein said pressure regulator and said actuator are coupled with a biased coupling tending to force said regulator and said actuator together such that a predetermined back pressure is substantially maintained at said print head and flow of ink through said valve mechanism is controlled as a function of expansion and contraction of said bag with respect to ambient atmospheric pressure against said biased coupling and a differential between a bias exerted by said biased coupling and ambient atmospheric pressure.

17. A method for delivering ink to a ink-jet pen, having a print head operating at a gauged predetermined negative pressure comprising the steps of:

providing a supply of ink in a positive pressure container;

controlling both flow of ink from said supply into said pen and said negative pressure simultaneously via balancing ambient atmospheric pressure in at least one lung mechanism within said pen against a positive bias acting to compress a pair of negative pressure control, ink flow control valving mechanisms within said pen.

18. The method as set forth in claim 17, said step of providing a supply of ink further comprising the steps of:

supplying a quantity of ink in a replenishable, flaccid bag.

19. An ink-jet pen, comprising:

a housing having an ink accumulator having an ink inlet port adapted to be coupled to a supply of ink;

a valve mounted at said port;

a ink-jet print head in fluidic communication with said ink accumulator;

a pressure regulator;

an actuator;

said regulator and actuator are coupled with a bias mounted to cause a force tending to move said regulator and said actuator together;

a counter bias acting against said bias as a function of ambient atmospheric pressure, wherein a substantially constant negative pressure is maintained at said print head and flow of ink from said supply through said valve is controlled via a balance of said force and ambient atmospheric pressure.

20. The pen as set forth in claim 19, said supply of ink further comprising:

a pressurizable container having a replaceable or refillable supply of ink therein.

21. The pen as set forth in claim 19, further comprising:

said print head has a plurality of ink-jet nozzles, said actuator and said regulator include a pair of levers, biased to create said substantially constant negative pressure as a predetermined back pressure to inhibit drooling from said nozzles, at least one of said levers carrying a valve seat of said valve such that motion of said levers controls flow of ink through said valve.

* * * * *